United States Patent Office 3,598,776
Patented Aug. 10, 1971

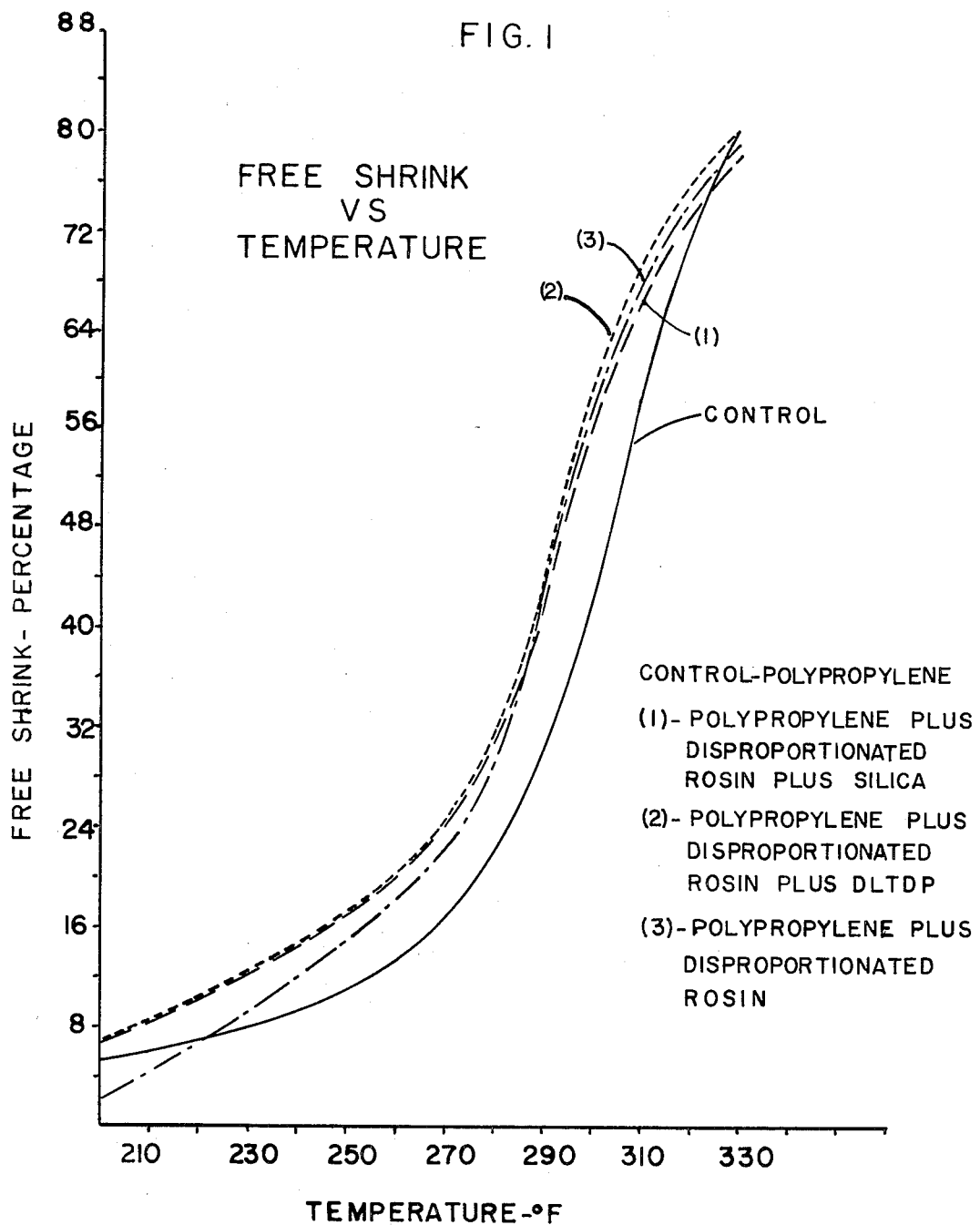

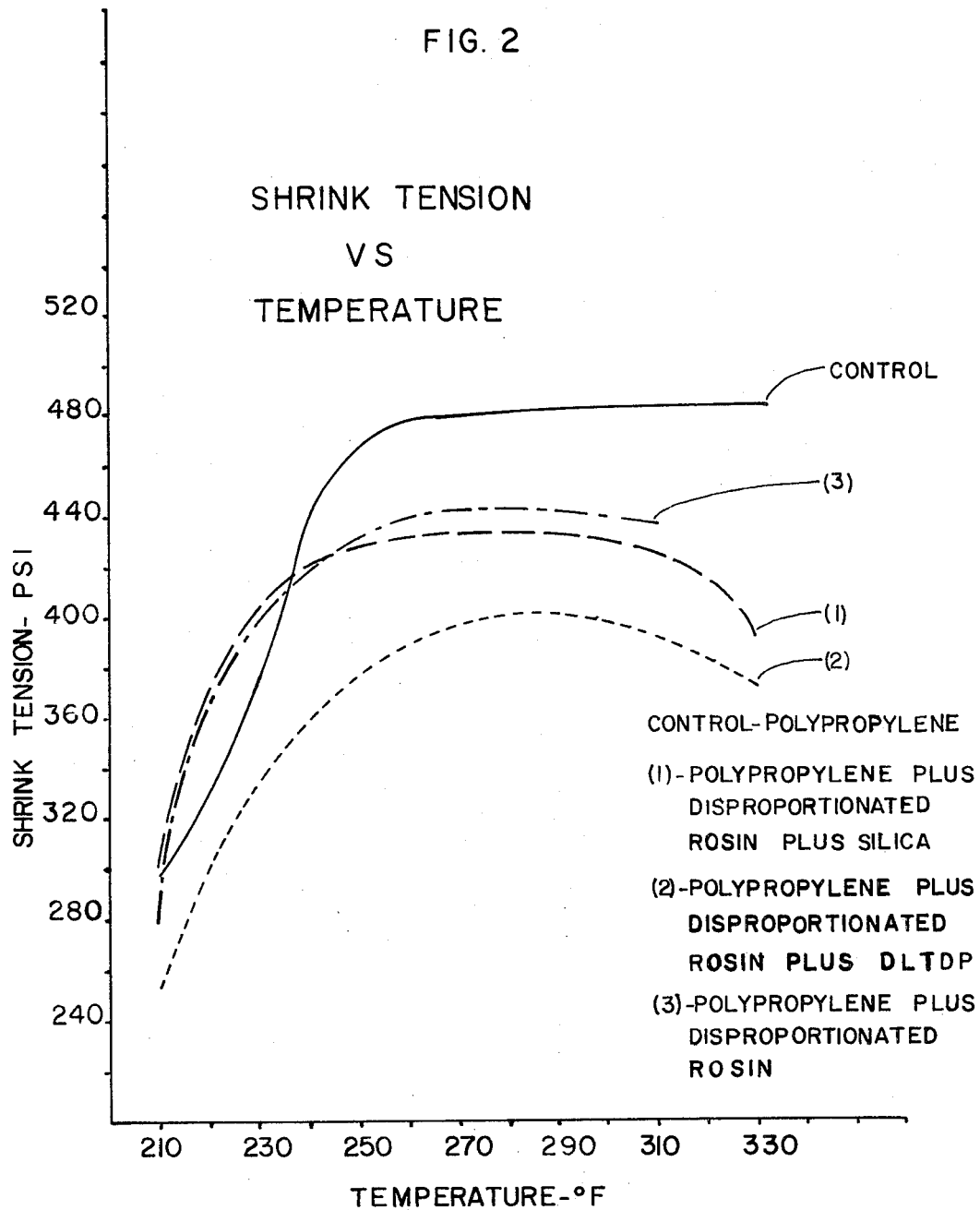

3,598,776
BLENDS OF DISPROPORTIONATED ROSIN, A STABILIZER, AND A THERMOPLASTIC POLYMERIC MATERIAL
Henry G. Schirmer, Spartanburg, S.C., assignor to W. R. Grace & Co., Duncan, S.C.
Filed June 28, 1965, Ser. No. 467,325
Int. Cl. C08f 45/58
U.S. Cl. 260—27
4 Claims

ABSTRACT OF THE DISCLOSURE

Addition of a disproportionated rosin to polypropylene makes it possible to include additional amounts of dilauryl thiodipropionate stabilizer in the polymer without stabilizer bloom.

---

This invention relates to blends of disproportionated rosin and a thermoplastic polymeric material. In one aspect, the invention relates to polymers having increased stability. In another aspect, the invention relates to biaxially oriented polymers of monoolefins having a propensity to shrink at lower temperatures and with reduced shrink energies.

It is well known to employ thermoplastic polymeric materials in the form of film or filaments. Especially useful are the polymers of monoolefins which have been extruded and formed into thin films. These films are employed in a multitude of ways, including the packaging of a wide variety of materials. These films are even more useful if they have been monoaxially or biaxially oriented to produce a film which will shrink when heat is applied to produce a skin-tight overwrap. The properties of each of these thermoplastic materials vary widely in such things as tensile strength, sealability, elongation, gloss, etc. An important property for many food products is the rate at which gases can permeate the film. The gas may evolve from the food itself, be trapped water vapor, or carbon dioxide, or the gas may be oxygen which must permeate into the inside of the package, e.g. certain red meat products.

Another very important property of molecularly oriented thermoplastic films is the ability to shrink at relatively low temperatures. This becomes increasingly important when the product enclosed within the film can be damaged by elevated temperatures normally employed in the heat shrinking step. Another property of considerable consequence is the shrink tension or force applied by the shrink energy of the film during the shrinking step. If the force is too great, the product may be deformed or warped.

It is an object of the invention to prepare a novel polymer of a monoolefin.

It is another object of the invention to provide a method for preparing a novel blend of a polymer of a monoolefin and an additive.

Still another object of the invention is to increase the stability of a polymer of a monoolefin.

Still another object of the invention is to provide an additive for a polymer of a monoolefin.

These and other objects of the invention will be readily apparent to those skilled in the art from the accompanying disclosure, drawings and appended claims.

These objects are broadly accomplished by incorporating a disproportionated rosin in a thermoplastic polymeric material. Surprisingly, it has been found that the addition of a small amount of a disproportionated rosin to a polymer, such as polypropylene or polyethylene, reduces the shrink tension of the polymer so as to reduce the post shrink deformation thus eliminating warpage of the wrapped product. In addition, the biaxially oriented film with the disproportionated rosin has the added advantage of having the same free shrink at a lower temperature than the polymer without the additive. For example, if it is desired to obtain a free shrink of 30%, a temperature may be employed which is considerably less than the temperature that would be necessary for a polymer without additive.

In addition, it has been surprisingly found that the disproportionated rosin makes it possible to include additional amounts of stabilizing materials in the polymer. The use of stabilizers in polymers is, of course, well known. However, many of these stabilizers, such as dilaurylthiodipropionate (DLTDP) are not completely compatible with a polymer and will bleed or exude to the surface thus reducing the stabilizing influence on the polymer. DLTDP is soluble in polypropylene in amounts of about 0.5 to 1%. When this concentration is exceeded the DLTDP will bleed out or bloom with time and pressure. For example, rolls of biaxially oriented polypropylene film containing 2% DLTDP will bloom after one month's storage. Surprisingly, the addition of 10% disproportionated rosin and 2% DLTDP to polypropylene produces a stable formulation—i.e., the stabilizer does not bloom. This is a significant discovery since the presence of increased amounts of stabilizer in the polymer effectively increases the period of time which the film may be exposed to sunlight. The ratio of rosin to stabilizer may vary over a wide range. A satisfactory additive blend contains 99 to 60 weight parts disproportionated rosin and 1 to 40% stabilizer.

The stabilizer may be incorporated directly into the polymer or added with the disproportionated rosin or a master batch of the rosin, stabilizer and polymer may be pre-blended and then added in proper amounts to the polymer to be extruded.

The disproportionated rosin employed as an additive in this invention may be prepared by any suitable means. The rosins are well known commercial items derived from both oleoresin and aged stump wood and composed of approximately 90 percent resin acids and 10 percent non-acidic material. Resin acids are a mixture of monocarboxylic acids of alkylated hydrophenanthrene nuclei. In general, the resin acids are classified as either the abietic type or the pimaric type. In general, the abietic type, such as abietic acid, is more useful because of the conjugated double bonds and the relative ease with which it may be converted. For simplicity, the discussion herein will be directed to abietic acid although it is to be understood that the invention is broadly applicable to resin acids. The abietic acid may be reacted in a number of ways, such as hydrogenation, which decreases the susceptability of rosin to air oxidation. Either one or both double bonds may be saturated by hydrogenation to form a dihydroabietic acid.

Another effective means of modifying rosins to render them less susceptible to oxidation is the disproportionation reaction. In effect, the reaction consists of the removal of two atoms of hydrogen from the two-double bond abietic-type acids and the rearrangement of the double-bond system to form an aromatic nucleus in the production of dehydroabietic acid. The hydrogen that is removed is readily absorbed by other two-double-bond abietic-type acids present in rosin to produce the stable dihydroabietic acid (and possibly some tetrahydroabietic acid). The principle reaction may be summarized as follows:

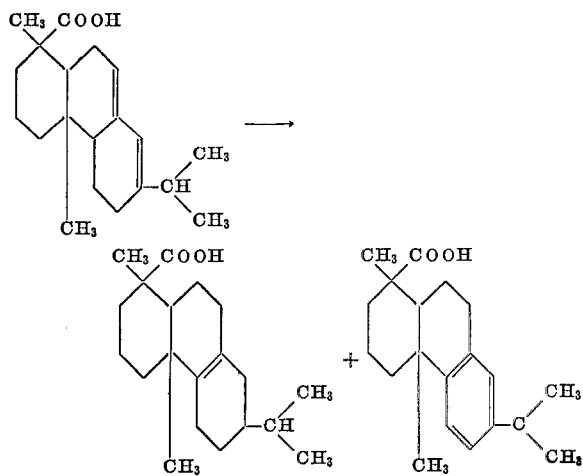

The reaction may be accomplished by any suitable means such as reacting with mineral acid, by heating at 270° C. for long periods or by the use of disproportionation catalysts such as iodine, sulfur, selenium, or noble metal on carbon supports.

The additive in the invention includes the reaction products of the disproportionation reaction including mixtures of dihydroabietic acid and dehydroabietic acid (which may include also tetrahydroabietic acid).

The invention is broadly applicable to thermoplastic polymeric materials including the polyolefins and polyvinyl materials, e.g. polystyrene. Particularly useful are the polymers of a monoolefin, such as those having from two to six, inclusive, carbon atoms per molecule, including, but not limited to, polyethylene, polypropylene, polybutene-1, polypentene, polyhexene and the like. Particularly preferred are polypropylene and polyethylene. The term polymer as employed herein includes homopolymers, copolymers, block copolymers, random copolymers, graft copolymers, laminates and the like. The polymer may be crosslinked such as by irradiation as described in the patents to Rainer et al. and Baird et al., supra.

Preferably the disproportionated rosin is incorporated in the polymer in an amount in the range of 0.1 to 60 weight percent based on total composition weight, more preferably 5 to 25 weight percent.

The disproportionated rosin may be incorporated into the polymer by any suitable means. For example, the polymer and disproportionated rosin are dry mixed (or blended in an extruder, extruded and pelletized) and then introduced into an extruder from which they are extruded at a temperature above the melting point of the polymer. The blend is then extruded to form a sheet or tubing which is cooled to below said melting point, heated to slightly below the melting point and biaxially oriented into a heat shrinkable film. Orientation may be accomplished in any suitable manner, e.g. stretching on a tenter frame or by blowing a bubble. The selection of extrusion and orienting conditions is well within the the skill of the art. In the case of polyethylene, the tape or tubing or sheet from the extruder may be irradiated prior to orientation, as best illustrated in the patents to Baird et al., U.S. 3,022,543, and to Rainer et al., U.S. 2,877,500, incorporated herein by reference.

The polymer composition may also include fillers, reinforcing agents, pigments, stabilizers, plasticizers, and the like.

It is also particularly effective to include a slip additive such as an unsaturated fatty acid amide in the polymer composition to decrease the tack of the polymer and improve the processability of the extruded film.

The invention is best illustrated by the following examples.

EXAMPLE I

Three rolls of biaxially oriented polypropylene film were prepared according to the following formulae:

(1) 10 wt. parts disproportionated rosin; 90 wt. parts polypropylene) melt flow of about 5, ASTM-D-1238-57T, condition L at 230° F.); and 0.25 wt. part colloidal silica.

(2) 10 wt. parts disproportionated rosin a low odor rosin; 82 wt. parts polypropylene; 10 wt. parts of a blend of 20 wt. parts dilaurylthiodipropionate (DLTDP, a stabilizer); and 80 wt. parts of polypropylene (3) 10 wt. parts disproportionated rosin a low odor rosin; and 90 wt. parts polypropylene.

For each of the samples the rosin was pulverized in a Fitzpatrick Hammer Mill. The pulverized rosin was then dry mixed with the polypropylene pellets (and other components) for about 10 minutes on a double shell tumbler. The mixture was then melt blended on a 1½ inch single screw extruder at 125 r.p.m. at maximum extruder temperatures of 420, 475 and 420° F., respectively. The die temperatures were 330°, 350° and 330° F., respectively.

The three thus prepared samples were then individually extruded at die temperatures of about 370° F. The tapes thus produced were 15, 15 and 10 mils in thickness and the tape (tubing) was about 5 inches in diameter. The extruded tubing samples were then biaxially oriented into film by first heating the tubing to about 270 to 285° F. and then inflating it with air at about 7 p.s.i. pressure to form a bubble.

The samples of film were then subjected to tests to determine free shrink, shrink tension and weather stability. The control was biaxially oriented polypropylene film.

TABLE I.—FREE SHRINK [1]

| Temperature, °F. | Sample (1), percent | | | Sample (2), percent | | | Sample (3), percent | | | Control, percent (polypropylene) | | |
|---|---|---|---|---|---|---|---|---|---|---|---|---|
| | Longitudinal | Transverse | Ave. | Longitudinal | Transverse | Ave. | Longitudinal | Transverse | Ave. | Longitudinal | Transverse | Ave. |
| 330 | 91 | 64 | 78 | 90 | 70 | 80 | 92 | 66 | 79 | 85 | 75 | 80 |
| 310 | 68 | 65 | 66 | 70 | 68 | 69 | 68 | 66 | 67 | 55 | 60 | 58 |
| 290 | 35 | 44 | 40 | 35 | 45 | 40 | 34 | 48 | 41 | 27 | 33 | 30 |
| 270 | 21 | 27 | 24 | 20 | 29 | 24 | 15 | 29 | 22 | 16 | 19 | 17 |
| 250 | 16 | 19 | 18 | 14 | 20 | 17 | 10 | 19 | 14 | 10 | 12 | 11 |
| 230 | 12 | 12 | 12 | 10 | 11 | 10 | 8 | 12 | 10 | 8 | 7 | 8 |
| 210 | 9 | 7 | 8 | 9 | 7 | 8 | 6 | 9 | 7 | 6 | 5 | 6 |

[1] Determined by measuring the change in distance between 10 cm. marks along two axes, longitudinal and transverse directions of the film after the sample has been submerged 4 seconds in polyethylene glycol at the above temperatures. The above numbers represent the average of four samples each, except that only two samples were averaged for the 330° F. samples. Ave. represents the average of the longitudinal and transverse averages.

These average values in Table I have been plotted in FIG. 1. It is evident that for a given temperature the compositions of this invention have an increased free shrink value of about 10% or an increase of up to about 50% over the control polypropylene.

TABLE II.—SHRINK TENSION [1]

| Temperature, °F. | Sample (1), p.s.i. | | | Sample (2), p.s.i. | | | Sample (3), p.s.i. | | | Control (polypropylene), p.s.i. | | |
|---|---|---|---|---|---|---|---|---|---|---|---|---|
| | Longitudinal | Transverse | Ave. | Longitudinal | Transverse | Ave. | Longitudinal | Transverse | Ave. | Longitudinal | Transverse | Ave. |
| 330 | 489 | 284 | 386 | 390 | 355 | 372 | 512 | 415 | 464 | 414 | 605 | 509 |
| 310 | 471 | 376 | 424 | 366 | 397 | 381 | 416 | 459 | 437 | 375 | 576 | 475 |
| 290 | 462 | 506 | 484 | 365 | 438 | 402 | 383 | 505 | 442 | 379 | 580 | 479 |
| 270 | 441 | 424 | 432 | 349 | 423 | 386 | 382 | 504 | 443 | 342 | 517 | 429 |
| 250 | 410 | 442 | 426 | 282 | 432 | 357 | 318 | 539 | 428 | 391 | 542 | 466 |
| 230 | 463 | 344 | 404 | 322 | 351 | 336 | 310 | 486 | 398 | 333 | 413 | 373 |
| 210 | 367 | 233 | 300 | 264 | 240 | 252 | 197 | 362 | 279 | 307 | 292 | 300 |

[1] Shrink tension is determined at the different temperatures by measuring the force exerted by a one (1) inch wide strip of film mounted between two arms of a holder, one arm being fixed and the other being connected to an electronic strain gauge. Calibration of the strain gauge permits calculation of the force in pounds per square inch of cross-sectional area of the sample. The thickness of the sample is determined in several locations and the lowest value employed in the calculation since the weakest point will be that of the smallest cross-sectional area. Ave. represents the average of the longitudinal and transverse values (which are averages of four determinations).

These average values in Table II have been plotted in FIG. 2 and demonstrate a reduction in shrink tension of up to about 100 p.s.i., particularly at temperatures from 240 to 330° F. (the melting point of polypropylene).

EXAMPLE II

Blends of disproportionated rosin and polyethylene were prepared by the procedure of Example I according to the following formulae:

(1) 20 wt. parts disproportionated rosin and 80 wt. parts polymer of ethylene
(2) Control—polymer of ethylene The blend was compounded on a 0.8 inch twin screw extruded at 300 r.p.m. at a maximum temperature of 335° F. The blend and control were then individually extruded with a 2½ inch extruder at a maximum temperature of about 340° F. and a die temperature of about 325° F. The extrudate was then hot blown into a 6-inch diameter tubing.

The oxygen permeability was determined to be about 3130 cc./24 hrs., atm., meter$^2$ for the control (2) and about 13,500 cc./24 hrs., atm., meter$^2$ for the blend (1), a four fold increase. The film thickness was about 1.4 mils.

Gas permeability is determined by placing the film specimen in a sealed cell so that the film completely separates the upper and lower sections of the cell. The cell and contents are maintained at room temperature (73° F.±2° F.) throughout the test. The top section is purged with dry nitrogen overnight. Dry oxygen (or gas to be tested) is introduced into the lower cell section and is permitted to permeate through the film for a predetermined period of time. The mixture of nitrogen and oxygen in the top section is introduced into a Holdane-Henderson-Orsat gas analysis apparatus. The oxygen in a sample is determined by absorption of the oxygen. The film thickness is determined in mils with a micrometer. The transmission rate is calculated in cc./24 hours, sq. meter, atm. The permeability is calculated in cc./mil, 24 hours, sq. meter, atm.

EXAMPLE III

Rolls of biaxially oriented polypropylene film containing 2 weight parts of dilaurylthiodipropionate (DLTDP) per 100 weight parts polypropylene bloomed after about one month's storage at room temperature. Rolls of similarly prepared polypropylene film containing 10 weight parts disproportionated rosin and 2 weight parts DLTDP did not bloom. The samples also demonstrated an increased stability to sunlight.

While certain examples, structures, composition and process steps have been described for purposes of illustration, the invention is not limited to these. Variation and modification within the scope of the disclosure and the claims can readily be effected by those skilled in the art.

I claim:
1. A blend consisting essentially of
   (I) about 1 to 60 weight parts of a disproportionated rosin consisting essentially of a mixture of dihydroabietic acid and dehydroabietic acid,
   (II) about 40 to 99 weight parts of polypropylene and
   (III) dilaurylthiodipropionate in an amount of from 1 to 5 weight parts and above the amount of said stabilizer that could be used in said polymer without the inclusion of said disproportionated rosin without stabilizer bloom.
2. The blend of claim 1 wherein (I) is present in an amount of 5 to 25 weight parts and (II) is present in an amount of from 75 to 95 weight parts.
3. The blend of claim 1 wherein the dilaurylthiodipropionate is present in an amount more than twice as great as the amount of said stabilizer that could be used in said polymer without the inclusion of said disproportionated rosin without stabilizer bloom.
4. The blend of claim 1 formed into an oriented film.

References Cited

UNITED STATES PATENTS 3,365,406   1/1968   Kopacki et al. _____ 260—23

DONALD E. CZAJA, Primary Examiner

M. J. WELSH, Assistant Examiner

U.S. Cl. X.R.

260—45.85